(12) United States Patent
Myers et al.

(10) Patent No.: US 8,377,232 B2
(45) Date of Patent: Feb. 19, 2013

(54) ON-LINE CLEANING OF TURBINE HOT GAS PATH DEPOSITS VIA PRESSURE PULSATIONS

(75) Inventors: Geoffrey David Myers, Simpsonville, SC (US); Michael John Hughes, Greer, SC (US); Atul Kumar Vij, Karnataka (IN)

(73) Assignee: General Electric Company, Schenectady, NY (US)

( * ) Notice: Subject to any disclaimer, the term of this patent is extended or adjusted under 35 U.S.C. 154(b) by 666 days.

(21) Appl. No.: 12/435,152

(22) Filed: May 4, 2009

(65) Prior Publication Data

US 2010/0275404 A1 Nov. 4, 2010

(51) Int. Cl.
B08B 7/00 (2006.01)
B08B 7/04 (2006.01)

(52) U.S. Cl. ......... 134/166 R; 134/17; 134/19; 60/646; 60/657

(58) Field of Classification Search ............... 134/16, 134/17, 166 R, 166 C, 184, 169 R, 19, 22.18, 134/22.12; 122/396; 165/95; 60/646, 657
See application file for complete search history.

(56) References Cited

U.S. PATENT DOCUMENTS

| | | | | |
|---|---|---|---|---|
| 3,258,919 A * | 7/1966 | Klein | | 60/39.77 |
| 3,877,219 A * | 4/1975 | Hagen | | 60/39.38 |
| 6,000,214 A * | 12/1999 | Scragg | | 60/39.38 |
| 6,883,302 B2 * | 4/2005 | Koshoffer | | 60/204 |
| 7,011,047 B2 | 3/2006 | Aarnio et al. | | |
| 7,047,908 B2 | 5/2006 | Henderson | | |
| 7,104,223 B2 | 9/2006 | Bussing | | |
| 7,360,508 B2 | 4/2008 | Habib et al. | | |
| 2004/0118104 A1 * | 6/2004 | Koshoffer | | 60/204 |
| 2005/0125930 A1 | 6/2005 | Flatness et al. | | |
| 2005/0125932 A1 | 6/2005 | Kendrick | | |
| 2005/0125933 A1 | 6/2005 | Hochstein, Jr. et al. | | |
| 2005/0126512 A1 | 6/2005 | Kendrick et al. | | |
| 2005/0126594 A1 | 6/2005 | Chenevert et al. | | |
| 2005/0126595 A1 | 6/2005 | Flatness et al. | | |
| 2005/0126597 A1 | 6/2005 | Hochstein, Jr. et al. | | |
| 2005/0130084 A1 | 6/2005 | Aarnio et al. | | |
| 2005/0199743 A1 * | 9/2005 | Hochstein et al. | | 239/67 |
| 2005/0217702 A1 | 10/2005 | Jokela et al. | | |
| 2006/0005786 A1 * | 1/2006 | Habib et al. | | 122/379 |
| 2006/0185623 A1 | 8/2006 | Aarnio et al. | | |
| 2008/0092828 A1 | 4/2008 | Flatness et al. | | |
| 2008/0271685 A1 | 11/2008 | Lupkes et al. | | |
| 2008/0292998 A1 | 11/2008 | Hochstein, Jr. et al. | | |
| 2009/0165438 A1 * | 7/2009 | Occhipinti | | 60/247 |

FOREIGN PATENT DOCUMENTS

| EP | 1962046 A1 | 8/2008 |
|---|---|---|
| WO | 2005095008 A1 | 10/2005 |

* cited by examiner

*Primary Examiner* — Alexander Markoff
(74) *Attorney, Agent, or Firm* — Cantor Colburn LLP

(57) ABSTRACT

A method for removing hot gas deposits from a system via pressure pulses is provided. The method includes regulating a flow of a mixture of detonation fluid and oxidizer into an expansion chamber; and generating a detonation within the expansion chamber by igniting the mixture of detonation fluid and oxidizer in the expansion chamber producing a high-pressure wave, the high-pressure wave propagating along a fluid path of the system in a supersonic rate removing hot gas deposits in the fluid path while the system is in fired operation, the expansion chamber directing the high-pressure wave towards the fluid path of the system.

9 Claims, 4 Drawing Sheets

ON-LINE CLEANING OF TURBINE HOT GAS PATH DEPOSITS VIA PRESSURE PULSATIONS

BACKGROUND OF THE INVENTION

The subject matter disclosed herein relates to an apparatus that allows on-line turbine hot gas path deposits to be removed from a hot fluid path of a system in fired operation using high-pressure pulses generated from pulsed detonation.

Many developments have been made on detonation wave-based soot blowing equipment to dislodge soot and ash build up from large-scale steam boilers fired on coal and other ash-bearing fuels. Gas turbines fired on heavy liquids will also experience contamination of the hot gas path with soot and ash deposits that must be removed on a regular basis via off-line water wash. The time required for the turbine to cool down prior to water and solvent injection, and to perform the off-line wash limits availability of these gas turbines fired on heavy fuel oil (HFO).

Industrial gas turbines fired on crude oil, heavy fuel oil, or other ash-bearing fuels must mix magnesium oxide (MgO) or another compound in the fuel as a vanadium getter to avoid hot corrosion of the hot gas path. MgO and other compounds, and inerts (silica) in these fuels produce slag and ash deposits on the hot gas path. If these deposits are not removed frequently, the aerodynamics of the turbine changes enough to render the system inoperable; it literally becomes clogged with deposits. The current practice is to use off-line water-wash, as frequently as daily or at least weekly, to remove deposits. The turbine must be taken off-line, cooled down significantly to near ambient temperature to avoid thermally shocking the metallic parts with water, and then water-washed with water and a solvent. Nutshells and other relatively frangible items can be injected into the system pneumatically while the rotor is fast-cranked to further blast off the hot gas parts (HGP) deposits.

Accordingly, it is desirable to remove ash deposits from a fluid path of a system while the system is in fired operation. It is further desirable to be able to remove ash deposits from a fluid path of a system while the system is operating at pressures greater than atmospheric pressure without the need of water or solvent.

BRIEF DESCRIPTION OF THE INVENTION

According to one aspect of the invention, a method for removing hot gas deposits from a system via pressure pulses is provided. The method includes regulating a flow of a mixture of detonation fluid and oxidizer into an expansion chamber; and generating a detonation within the expansion chamber by igniting the mixture of detonation fluid and oxidizer in the expansion chamber producing a high-pressure wave, the high-pressure wave propagating along a fluid path of the system in a supersonic rate removing hot gas deposits in the fluid path while the system is in fired operation, the expansion chamber directing the high-pressure wave towards the fluid path of the system.

According to another aspect of the invention, an apparatus for removing hot gas deposits from a system via pressure pulses is provided. The apparatus includes an expansion chamber configured to receive a mixture of detonation fluid and oxidizer; and an initiator configured to ignite the mixture of detonation fluid and oxidizer in the expansion chamber generating a detonation within the expansion chamber producing a high-pressure wave, the high-pressure wave propagating along a fluid path of the system in a supersonic rate removing hot gas deposits in the fluid path while the system is in fired operation, the expansion chamber directing the high-pressure wave towards the fluid path of the system.

According to yet another aspect of the invention, a system for removing turbine hot gas path deposits from a fluid path of a gas turbine via pressure pulses is provided. The system includes an expansion chamber disposed within a combustion chamber of the gas turbine, the expansion chamber is configured to receive a mixture of detonation fluid and oxidizer; and an initiator configured to ignite the mixture of detonation fluid and oxidizer in the expansion chamber generating a detonation within the expansion chamber creating a high-pressure wave, the high-pressure wave propagating into the combustion chamber and along a fluid path of the gas turbine in a supersonic rate removing turbine hot gas path deposits in the fluid path while the gas turbine is operating at pressures greater than atmospheric pressure, the high-pressure wave is directed into the combustion chamber and through the fluid path of the gas turbine by the expansion chamber.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Exemplary embodiments are directed to an apparatus that allows on-line hot gas deposits, or more specifically, turbine hot gas path deposits (soot, clinker, ash, slag, and other fuel and air-borne combustion byproducts, henceforth "ash deposits") to be removed from a hot fluid path of a system (e.g., gas turbine) through high-pressure waves or pulses generated from pulse detonation. The system described herein can be any type of system that burns heavy fuel oil, pulverized coal, or other ash-bearing fuels. Exemplary embodiments are further directed to an apparatus that can operate in a periodic or cleaning mode to dislodge or remove ash deposits from a hot fluid path of a system through high-pressure pulses generated from periodic detonation of a mixture of detonation liquid (e.g., ethylene) and oxidizer (e.g., compressed air) or can operate as an ignition system or diffusion pilot by operating in a continuous mode. Exemplary embodiments are also directed to a system incorporating these exemplary apparatuses for on-line removal of ash deposits via high-pressure pulses from pulsed detonation. Further, in these embodiments, the system includes a processor for enabling the apparatus to operate as a cleaner as well as a torch ignition system for starting, or as a diffusion-flame pilot for improved operability at part-load.

In accordance with one exemplary embodiment, the apparatus allows on-line ash removal from a hot gas path of a system burning heavy fuel oil, pulverized coal, or other ash-bearing fuels using high-pressure waves or pressure pulses generated by periodic pressure-gain combustion or pulsed detonation. In one non-limiting exemplary embodiment, the apparatus is disposed in a combustion assembly of a fuel-burning system. For example, the apparatus can be disposed within a combustor chamber of a gas turbine. In this example, the apparatus comprises a solenoid or rotary valve(s) associated with a fuel/air-metering device and located outside of the combustor chamber for regulating the flow of fuel air into a detonation tube or expansion chamber, which guides or directs the high-pressure waves into the combustion chamber and effectively along the hot gas path of the gas turbine. Using this same example, the apparatus can be controlled by a processing system, which enables the apparatus to operate in a first mode of operation (e.g., periodic supply of fuel and air) or a second mode of operation (e.g., continuous supply of fuel and/or air).

Figure 1:
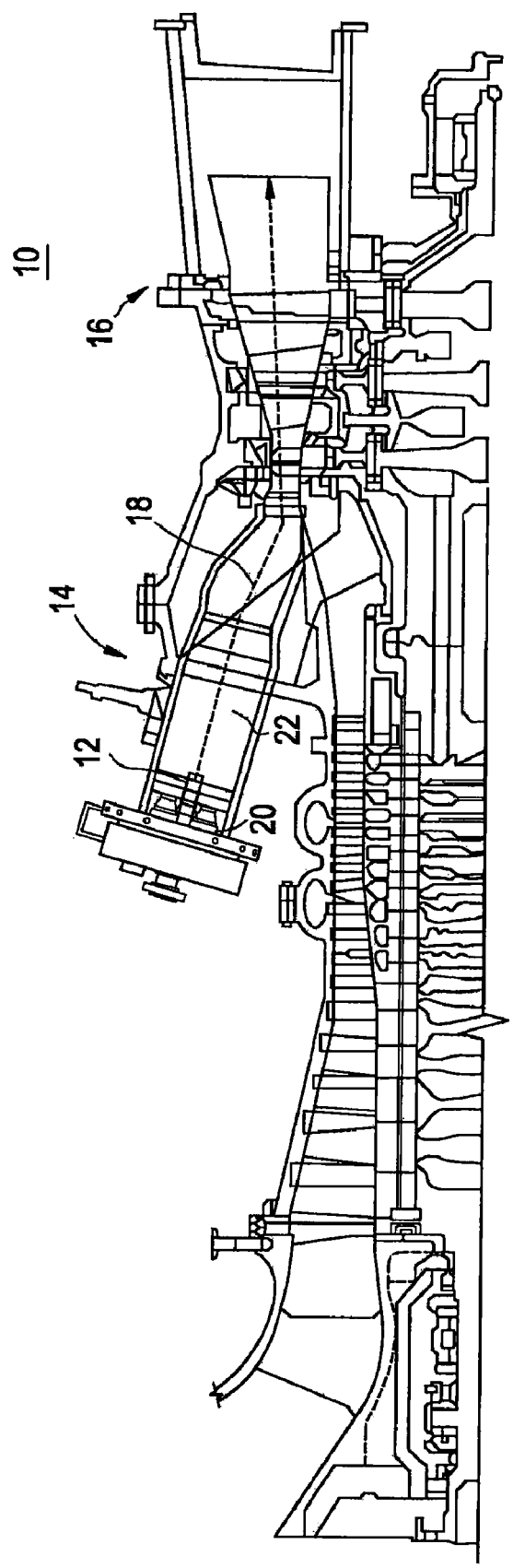
FIG. 1 is a cross-sectional view of a gas turbine with an apparatus for removing turbine hot gas path deposits from a hot gas path of the gas turbine in accordance with one exemplary embodiment of the present invention.

Now referring to the drawings, FIG. 1 is a schematic illustrating a system 10 for removing ash deposits from a fluid path or a hot gas path of a gas turbine in accordance with one exemplary embodiment. The system 10 generally includes an apparatus 12 being incorporated into a combustor assembly 14 of a gas turbine 16 and configured to remove ash deposits from a hot gas path, which is generally indicated by dashed arrow 18, of the gas turbine 16. The hot gas path 18 is defined between the combustor assembly 14 and an output end of the gas turbine 16 in accordance with one exemplary embodiment. In accordance with one exemplary embodiment, the apparatus 12 is a pulse generator that can operate as a multipurpose device (torch igniter, pilot flame, and pulse-jet cleaner).

The pulse generator 12 in accordance with exemplary embodiment of the present invention can be incorporated into a combustor assembly 14 with varying configurations and should not be limited to the configuration shown in FIG. 1. In general, high-pressure gas is supplied to combustor assembly 14 and mixed with fuel, for example process gas and/or synthetic gas, in a nozzle 20. The fuel/air or combustible mixture is passed into a combustor chamber 22 and ignited by a spark plug 22 to form a high pressure, high temperature combustion gas stream. However, in accordance with one exemplary embodiment of the present invention, the pulse generator 12 can be used to ignite the fuel/air mixture in the combustor chamber 22 or initiate the combustion process in the combustor chamber 22, which will be described in more detail below. This embodiment eliminates the need for conventional spark plug(s) used to light or re-light the combustion chamber in the combustor assembly and crossfire tubes conventionally used to light other combustion chambers of the combustion assembly.

Figure 2:
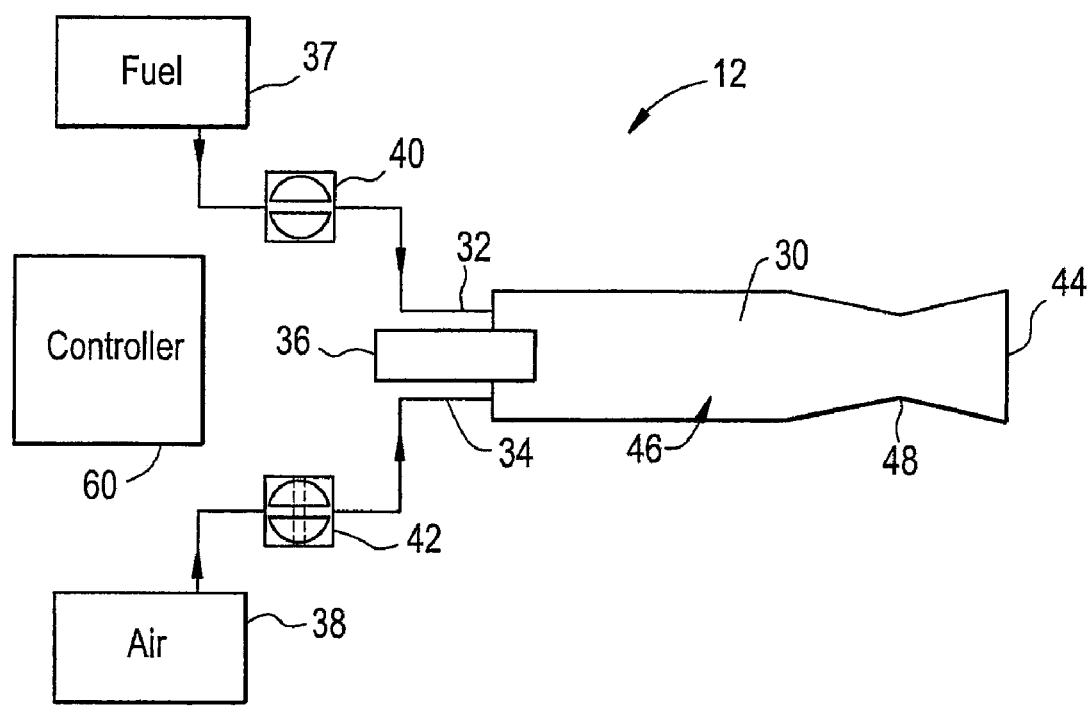
FIG. 2 is a schematic of the apparatus for removing turbine hot gas path deposits from the hot gas path of the gas turbine in accordance with one exemplary embodiment of the present invention.

Referring now to FIG. 2, the basic elements of the pulse generator 12 generally include an expansion chamber 30, a first input port 32, a second input port 34, and an initiator 36. The chamber 30 is supplied with a mixture of detonation fluid and oxidizer (e.g., air) via the first input port 32 and a second input port 34 respectively in accordance with one embodiment. Detonation fluid is supplied from a first source 36 (e.g., a metered fuel supply) while oxidizer is supplied from a second source 38 (e.g., a compressed air supply) in accordance with one embodiment. In one alternative embodiment, the detonation fluid is supplied from the same source that supplies fuel to the combustor assembly. In one embodiment, the amount of detonation fluid supplied to the expansion chamber 30 is less than the amount of fuel supplied to the combustor assembly, such as, for example, approximately one percent of the main turbine fuel flow. In other words, the detonation fluid needed to support detonations within the expansion chamber is less than the amount of fuel needed to support the main combustion of the gas turbine.

The apparatus 12 further includes a first valve 40 and a second valve 42 that regulate the flow of detonation fluid and oxidizer into the chamber 22 respectively to vary the frequency and amplitude of the pressure waves in accordance with one embodiment. Although only one valve is associated with each supply source as illustrated FIG. 2, it should be understood that a combination of valves in varying locations could be used to regulate or vary the flow of detonation fluid and oxidizer into the chamber 22. In one embodiment, the first valve 40 and the second valve 42 are located outside of chamber 22. The first valve 40 and the second valve 42 each can be any type of valve or control device configured to regulate the flow of detonation fluid and oxidizer into the expansion chamber 30. For example, the first valve 40 and the second valve 42 are conventional rotary valves with rotating drums driven by, for example, a variable electric motor. The first valve 40 enables the flow of detonation fluid into the chamber 22 to be periodic or continuous depending on the mode of operation. Similarly, the second valve 42 enables the flow of oxidizer into the chamber 22 to be periodic or continuous depending on the mode of operation. The second valve 42 can also selectively prevent the flow of oxidizer into the chamber 22 depending on the mode of operation, which will be described in more detail below.

In accordance with one exemplary embodiment, the initiator 36 is configured to ignite the mixture of detonation fluid and oxidizer in the expansion chamber 30 creating a detonation event within the expansion chamber 30. The detonation within the expansion chamber 30 rapidly increases the pressures within the expansion chamber 30 and creates a high-pressure wave. The high-pressure wave generated by the pressure-gain combustion event (detonation) within the expansion chamber 30 propagates in supersonic speeds through a nozzle 44, defined at one end of the expansion chamber 30, into combustor chamber 22 and along the hot gas path 18 of the gas turbine 16 dislodging the ash deposits and out the exhaust output end of the gas turbine 16. The ash deposits are then carried out of the turbine by the bulk flow. The high-pressure wave dislodges or removes ash deposits or unwanted soot from the hot gas path 18 and effectively from the static components (e.g., first stage nozzles) of the gas turbine. In accordance with one non-exemplary embodiment, the initiator 36 is a spark plug. In another non-limiting exemplary embodiment, the initiator 36 is a plasma torch. Of course, the initiator 36 can be any device configured to set off the mixture of detonation fluid and oxidizer in the expansion chamber 30 in accordance with other exemplary embodiments.

Figure 3:
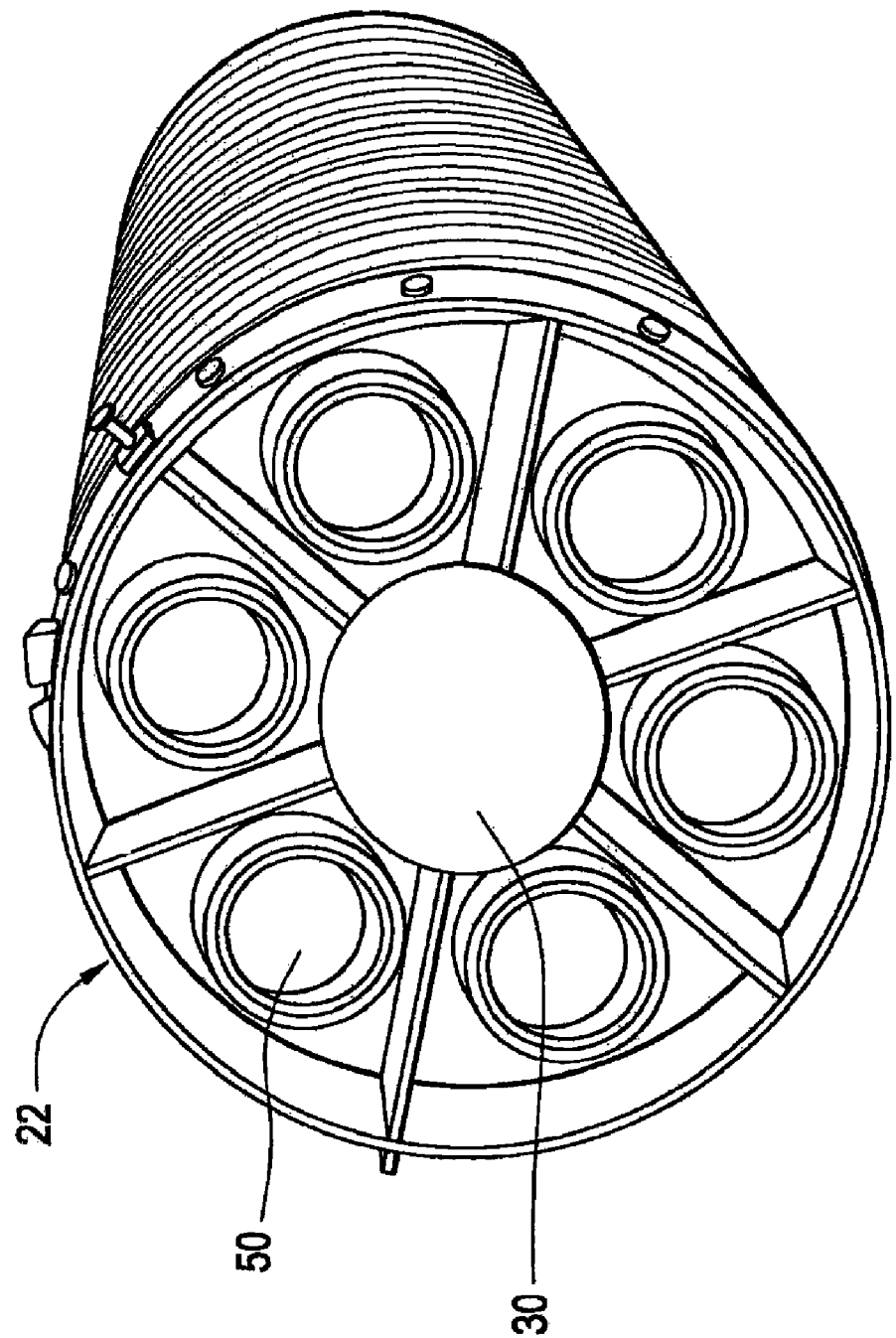
FIG. 3 is a cross-sectional perspective view of the apparatus disposed within a combustor chamber of the gas turbine in accordance with one exemplary embodiment of the present invention.
Figure 4:
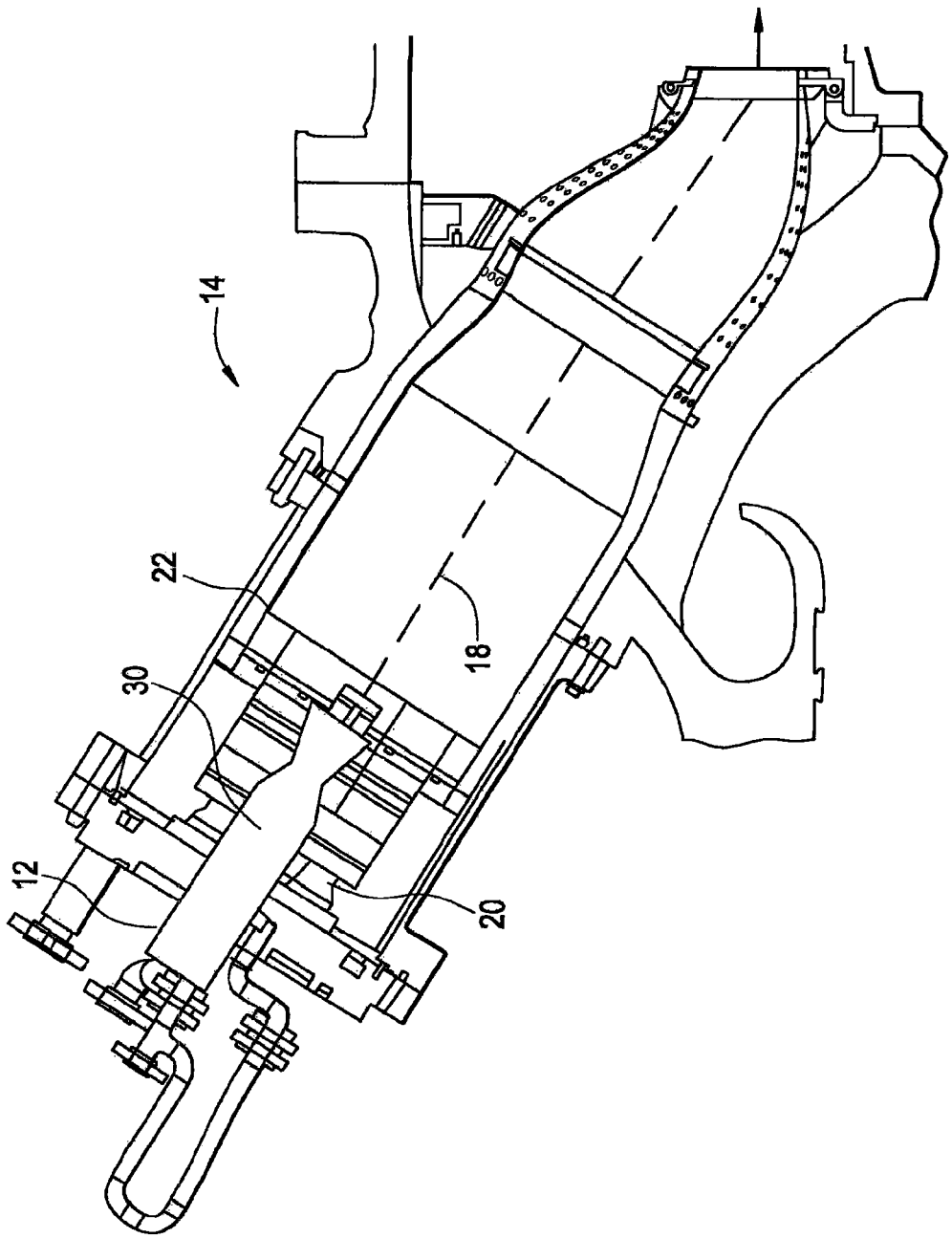
FIG. 4 is a cross sectional view of a combustor assembly of the gas turbine incorporating the apparatus within one combustor chamber in accordance with one exemplary embodiment of the present invention.

In accordance with one exemplary embodiment, the expansion chamber 30 is a cylindrical tube that guides the high-pressure wave into the combustion chamber 22 and is configured to generate detonations in an inner hollow space or a reaction zone 46 defined within the expansion chamber 30 in accordance with one exemplary embodiment. In one exemplary embodiment, the expansion chamber 30 of the pulse generator 12 is axially disposed within combustor chamber 22 as shown in FIGS. 3 and 4. In one non-limiting exemplary embodiment, the expansion chamber 30 is disposed at the centerline of the combustor chamber 22 and surrounded by a number of fuel injector interfaces 50 of the combustor chamber 22. Of course, the expansion chamber 30 can be inserted within combustor chamber 22 in varying configurations and should not be limited to the arrangement shown. The combustor chamber 22 receiving the expansion chamber 30 can be a can-type, annular combustion chamber, or otherwise.

In accordance with one non-limiting exemplary embodiment, the diameter size of the expansion chamber 30 is one inch. Of course, the diameter size of the expansion chamber 30 can be greater or less than one inch depending on the application. The expansion chamber 30 can be of any size or configuration in accordance with other exemplary embodiments and should not be limited to the configuration described herein. In one embodiment, the expansion chamber 30 includes a choke point 48 defined between one end of the expansion chamber 30 (a closed end proximate the initiator) and another end of the expansion chamber 30 or the nozzle end 44 of the expansion chamber 30. The choke 48 facilitates the restriction of the fluid flow and increases the pressures within the expansion chamber 30 that enable the high-pressure wave to reach super sonic speeds in accordance with one embodiment. The configuration of the expansion chamber 30 is such that once the expansion chamber 30 is injected with a mixture of detonation fluid and oxidizer and the initiator ignites the mixture, a detonation or a detonation event occurs within the expansion chamber 30 creating a high-pressure wave that propagates through the fluid in the expansion chamber 30 due to an energy release in the reaction zone of the expansion chamber 30. The high-pressure wave propagates in a super sonic rate into combustor chamber 22 and along the hot gas path 18 of the gas turbine 16 dislodging ash deposits from the hot gas path 18.

Referring back to FIG. 2, a controller 60 is in communication with the pulse generator 12 for enabling the pulse generator 12 to operate in a first mode of operation (periodic mode) where the pulse generator 12 is used as a cleaning device or a second mode of operation (continuous mode) where the pulse generator 12 can be used as a torch ignition system or a pilot flame. In one embodiment, the controller 60 is external to the expansion chamber 30 and is coupled to the first valve 40, the second valve 42 and initiator 36 via cables in accordance with one exemplary embodiment. It is contemplated that in other exemplary embodiments, the controller 60 is configured to wirelessly communicate with the valves and the initiator or other devices to enable the pulse generator 12 to operate in either the cleaning mode or the continuous mode where the pulse generator 12 is used as an integral igniter or diffusion pilot.

During the first mode of operation, the pulse generator 12 dislodges or removes the ash deposits from the hot gas path 18 of the gas turbine 16 through periodic high-pressure pulses or waves generated from periodic detonation. Periodic detonation occurs by providing the expansion chamber 30 of the pulse generator 12 an intermittent supply of detonation fluid and air and periodically igniting the supply of fuel/air in the chamber 30. The first valve 40 and the second valve 42 enable detonation fluid and oxidizer to periodically flow into the chamber 30 respectively during the first mode of operation, which enables the creation of pressure waves generated from pulsed detonation. This oscillating supply of fuel/air and the occurrence of these periodic or pulsed detonation events create high-pressure waves used to dislodge ash deposits from the hot gas path 18 of the gas turbine 16. In accordance with one exemplary embodiment, the gas turbine 16 is in fired operation during the first mode of operation, the second mode of operation, or both. In one non-limiting exemplary embodiment, the gas turbine 16 is operating at pressures greater than atmospheric pressure during the cleaning mode or continuous mode. Therefore, detonation cleaning could occur with the gas turbine running at load, which can effectively reduce system down time significantly.

In accordance with one exemplary embodiment, the controller 60 can create variable frequency pulsations for ash removal in combustion chamber 22 as well as in the other combustions chambers (not shown) of the gas turbine engine that also employ their own pulse generator in accordance with one embodiment. In other words, the controller 60 is configured to independently control the pulse frequency in each chamber of the gas turbine engine to avoid coherent pulsations in accordance with one exemplary embodiment. The controller 60 controls the pulse frequency in chamber 22 by controlling the operations of valves 40, 42 and initiator 36. In one embodiment, the controller 60 varies the pressure oscillations or waves to interfere constructively with dynamic pressure oscillations in the combustion chamber 22 increasing the amplitude for more effective cleaning or adjusts the frequency and phase of the pressure oscillations to destructively interfere with dynamic pressure oscillations to reduce amplitudes. The variable frequency of the pressure oscillations can be used to optimize cleaning of the hot gas path while avoiding frequencies that might damage downstream parts along the hot gas path. For example, the controller 60 can adjust the frequency of the pressure oscillations to match up with the resonant frequency of a component (e.g., first stage nozzle) in the hot gas path to facilitate in the removal of ash/soot on the component.

During the second mode of operation, the pulse generator 12 is operating at a continuous mode. In the second mode of operation, the pulse generator 12 can be used as a torch igniter to start the gas turbine or re-light a blown-out combustion chamber or as a pilot flame to stabilize the combustion chamber. When the pulse generator 12 is used as a torch igniter, the first valve 40 and the second valve 42 are locked in a continuous flow position that allows detonation fluid and oxidizer to continuously flow into the chamber 30. The initiator 36 ignites the mixture of detonation fluid and oxidizer in the chamber 30 when the pulse generator is used as a starting torch. This initiates the combustion process in the combustion chamber 22 in accordance with one embodiment and starts the gas turbine without the need of conventional spark plugs. When the pulse generator 12 is used as a pilot flame in constant deflagration (steady flame) mode, the first valve 40 enables detonation fluid to flow continuously into chamber 30 and the second valve 42 either enables oxidizer to flow continuously into chamber 30 for a leaner mixture or selectively prevents oxidizer to flow into chamber 30 as suggested by the dashed lines in FIG. 2. The pilot flame stabilizes the combustion chamber 22, which is assumed to be operating. Consequently, this eliminates the need for the initiator. In other words, the initiator during the second mode of operation initially ignites the mixture of detonation fluid and oxidizer and once the initiator ignites the mixture the initiator is no longer needed since the flame can be stabilized through the continuous flow of detonation fluid.

In accordance with one exemplary embodiment, the controller 60 can be in signal communication with an operating system (not shown) of the gas turbine engine or an integral part of the operating system depending on the application. In one exemplary embodiment, the controller 60 selectively places the pulse generator 12 in periodic cleaning mode based on input data relating to the health, status, and/or condition of the combustor assembly or the gas turbine. For example, if the output of the gas turbine is low, the pulse generator 12 can be set to the first mode of operation. Similarly, if the gas turbine needs a start up or the combustor chamber needs to be re-lighted, the pulse generator 12 can be set to the second mode of operation.

In accordance with one embodiment, the controller can receive various input data from various sources (e.g., sensors) to control the speed (frequency) of the valves 40, 42 and the operations/functions (e.g., timing, current, voltage, etc.) of the initiator 36. The input data received by the controller can include, for example, load, firing temperature, compressor discharge pressure and temperature, combustor static pressure, dynamic pressure amplitude and frequency, expansion chamber wall temperature, main flame detector status, expansion chamber flame detector status, expansion chamber status pressure, combustor operating mode, fired hours since last cleaning cycle or a combination thereof. Of course, the controller can receive other types of input data relating to the health, status, and/or condition of the combustor assembly or the gas turbine and should not be limited to the examples described above.

In accordance with one exemplary embodiment, the detonation fluid used in the pulse generator 12 comprises one or a combination of various volatile liquid fuels. More specifically, the expansion chamber 30 can be supplied with one or a combination of volatile liquid fuels, or gaseous fuels such as, hydrogen, natural gas, propane, butane, and gasoline as well as bottled gas. Of course, other volatile fuels (e.g., ethylene, methanol or propane) can be used to supply expansion chamber 30 with a detonation fluid in accordance with other exemplary embodiments and should not be limited to the examples described herein. It is contemplated that other hydrocarbon gases that can easily be stored in liquid form can be used as detonation fluid for the pulse generator in accordance with other exemplary embodiments.

Exemplary embodiments of the pulse generator 12 allows for more frequent cleaning, which improves net performance and may enable higher firing temperatures, output, and efficiency. Exemplary embodiments of the pulse generator 12 can be useful as an ignition torch and high temperature pilot as described, which can be useful features when attempting to operate on residual oils which are neither as volatile as convention diesels, nor as easily atomized into an ignitable spray. The exemplary embodiments of the pulse generator 12 described herein eliminate or reduce the need for water or solvents commonly used for cleaning ash deposits in a gas turbine. The exemplary embodiments of the pulse generator described herein further enable the turbine to be cleaned by the pressure pulses while the gas turbine is in fired operation. The amount of detonation fuel used by the apparatus is low (e.g., 1/50 of the turbine fuel flow) and the cleaning energy released can be partially recovered in the gas turbine.

It should be understood that the cleaning process in continuous mode allows the energy released by the detonation fluid to be partially recovered in the gas turbine and the associated combined-cycle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus for removing hot gas deposits from a system via pressure pulses, comprising:
    an expansion chamber configured to receive a mixture of detonation fluid and oxidizer;
    an initiator;
    a first control device configured to regulate flow of detonation fluid; and
    a second control device configured to regulate flow of oxidizer, the first control device and the second control device selectively operable in a first mode of operation and a second mode of operation; and
    a controller in communication with the initiator, the first control device, and the second control device, the controller configured to:
    selectively control operation of the first control device and the second control device in the first mode of operation to regulate flow of detonation fluid and oxidizer periodically into the expansion chamber, or the second mode of operation to provide a continuous flow of detonation fluid, and one of a continuous supply and selective prevention of oxidizer to the expansion chamber, and
    control operation of the initiator to ignite the mixture of detonation fluid and oxidizer during the first mode of operation to create a detonation, the detonation configured to create a high pressure wave that substantially removes hot gas deposits while the system is in fired operation, and initially ignites the mixture of detonation fluid and oxidizer in the second mode of operation.

2. The apparatus as in claim 1, wherein the controller controls the flow of detonation fluid and oxidizer supplied by the first control device and the second control device to vary a frequency and amplitude of the high-pressure waves.

3. The apparatus as in claim 1, wherein the controller is configured to control the apparatus as one of a torch igniter or a pilot flame for the system in the second mode of operation, wherein the controller controls the first control device and the second control device to be locked in a continuous flow position as the torch igniter, and wherein the controller is configured to control the first control device to flow detonation fluid continuously and the second control device to flow oxidizer continuously or selectively prevent oxidizer to flow as the pilot flame.

4. The apparatus as in claim 1, wherein the first control device and the second control device are rotary valves.

5. The apparatus as in claim 1, wherein the system is a gas turbine operating at pressures greater than atmospheric pressure while in fired operation.

6. The apparatus as in claim 1, wherein the initiator is a spark plug.

7. A system for removing turbine hot gas path deposits from a fluid path of a gas turbine via pressure pulses, comprising:
    an expansion chamber disposed within a combustion chamber of the gas turbine, the expansion chamber is configured to receive a mixture of detonation fluid and oxidizer;
    an initiator;
    a first control device configured to regulate flow of detonation fluid; and a second control device configured to regulate flow of oxidizer, the first control device and the second control device selectively operable in a first mode of operation and a second mode of operation; and a controller in communication with the initiator, the first control device, and the second control device, the controller configured to:

selectively control operation of the first control device and the second control device in the first mode of operation to regulate flow of detonation fluid and oxidizer periodically into the expansion chamber, or the second mode of operation to provide a continuous flow of detonation fluid, and one of a continuous supply and selective prevention of oxidizer to the expansion chamber, and control operation of the initiator to ignite the mixture of detonation fluid and oxidizer during the first mode of operation to create a detonation, the detonation configured to create a high pressure wave that substantially removes hot gas deposits while the system is in fired operation, and initially ignites the mixture of detonation fluid and oxidizer in the second mode of operation.

8. The system as in claim 7, wherein the mixture of detonation fluid and oxidizer comprises of at least one volatile liquid fuel, at least one hydrocarbon gas or a combination thereof.

9. The apparatus as in claim 5, wherein an amount of detonation fluid used by the apparatus in the first mode of operation is about $1/50$ of a turbine fuel flow.

* * * * *